Sept. 10, 1963     W. G. RUSSBACH ET AL     3,103,549
PAPER INSULATED CONDUCTOR
Filed Feb. 16, 1961
INVENTORS.
STANLEY A. TEISER
WALTER G. RUSSBACH
BY

3,103,549
PAPER INSULATED CONDUCTOR

Walter G. Russbach, Woodbury, N.J., and Stanley A. Teiser, Beaumont, Tex., assignors to E. I. du Pont de Nemours and Company, Wilmington, Del., a corporation of Delaware
Filed Feb. 16, 1961, Ser. No. 89,870
2 Claims. (Cl. 174—124)

The present invention relates to a novel paper for use as electrical insulation. More specifically, this invention relates to a novel paper prepared from low-nitrogen-content nitrocellulose and having unusual electrical properties.

Cellulose paper has long been used as electrical insulation in various applications, such as a covering for conductors, for example. However, paper has a high dissipation factor and electrical loss, and is thus of limited utility despite its low cost and ready availability. We have discovered that when paper is prepared from a fibrous nitrocellulose starting material containing from about 0.5% to about 6.0% by weight of nitrogen, as distinguished from unsubstituted cellulose fibers, it has a significantly lower dissipation factor and electrical loss than does plain paper.

In accordance with the present invention, cellulose is first nitrated to produce a nitrocellulose containing from about 0.5% to 6.0% by weight of nitrogen, and the resulting low-nitrogen nitrocellulose is then pulped and made into paper by conventional methods in order to provide a material having excellent insulating properties.

The accompanying drawing shows in cutaway view an electrical conductor insulated with the low-nitrogen nitrocellulose paper of the present invention.

Referring now specifically to the drawing, 1 is an electrical conductor wrapped with low-nitrogen-content nitrocellulose paper 2 and provided with an outer waterproof coating 3, for example, of rubber, wax, or resin.

The following examples are submitted to illustrate the preparation of low-nitrogen nitrocellulose. Parts and percentages, where given, are by weight.

EXAMPLE 1

A charge of 300 parts of nitration-grade cotton linters was immersed in 18,000 parts of a nitrating bath consisting of 45.8% of nitric acid, 22.2% of sulfuric acid, and 32.0% of water. The resulting slurry was maintained at 27° C. for 30 minutes under agitation with a paddle mixer operated at approximately 50 revolutions per minute. The slurry was then centrifuged; the nitrocellulose was removed from the centrifuge, drowned in water, washed on a screen with deionized water for approximately 5 minutes (until the used wash water was neutral), and dried. The dry nitrocellulose had a nitrogen content of 2.37% and a stability to methyl violet paper of more than 35 minutes.

EXAMPLE 2

Three hundred parts of nitration-grade cotton linters was nitrated in 18,000 parts of mixed acid according to the procedure described in Example 1 except that the nitrating bath consisted of 45.0% of nitric acid, 24.5% of sulfuric acid, and 30.5% of water. The washed and dried nitrocellulose contained 3.40% nitrogen and had a stability to methyl violet paper of more than 45 minutes.

EXAMPLE 3

A charge of 300 parts of nitration-grade cotton linters was nitrated for 30 minutes at 27° C. in a mixed acid bath consisting of 45.1% of nitric acid, 28.4% of sulfuric acid, and 26.5% of water. Spent acid was removed from the nitrocellulose by centrifuging. The nitrocellulose was removed from the centrifuge, drowned in water, and washed to neutrality on a screen with deionized water. The washed nitrocellulose was then boiled in water containing 0.4% $H_2SO_4$ for 16 hours, again washed to neutrality, and dried. The dry nitrocellulose, which contained 5.20% nitrogen, had a stability to methyl violet paper of more than 30 minutes.

Handsheets were prepared from the nitrocelluloses prepared in Examples 1 to 3. In addition, handsheets were prepared from un-nitrated nitration-grade cotton linters for comparison purposes. Examples 4 through 7 illustrate the method used to prepare the handsheets.

EXAMPLE 4

Eighty grams (dry basis) of unsubstituted nitration-grade cotton linters was beaten in a Waring Blendor for 20 minutes in 2.5-gram portions mixed with sufficient water to form a slurry containing 1% solids. The portions were combined and aliquot portions each containing 2.5 grams of solids were beaten in the Waring Blendor for another 20 minutes. The aliquots were combined and the blend was redivided into aliquots containing 2.5 grams of solids. These aliquots were each beaten for 25 minutes, making the total beating time 65 minutes. The final Canadian freeness of the pulp was 290 milliliters. The pulp slurry was transferred to the proportioning tank of a Noble and Wood handsheet machine and diluted to a consistency of 0.41%. Handsheets were prepared by adding to the handsheet mold one-quart portions of the adjusted slurry from the proportioning tank and forming sheets at 0.04% consistency. The sheets were couched under standard conditions recommended by Noble and Wood, and subsequently drum-dried at 200° F. Final basis weight of the sheets was 58 pounds per ream (500 sheets, 24 by 36 inches).

EXAMPLE 5

Eighty grams (dry basis) of the nitrocellulose prepared in Example 1 (containing 2.3% nitrogen) was beaten in a Waring Blendor for 56 minutes in 2.5-gram portions at a consistency of 1%. The final Canadian freeness of the pulp was 300 milliliters. The combined portions were transferred to the proportioning tank of a Noble and Wood handsheet machine and diluted to a consistency of 0.41%. Handsheets were prepared by adding one-quart aliquots of the adjusted slurry from the proportioning tank to the handsheet mold and forming sheets at 0.04% consistency. The sheets were couched under standard conditions recommended by Noble and Wood, and subsequently were drum-dried at 200° F. Final basis weight of these sheets was 58 pounds per ream (500 sheets, 24 by 36 inches).

EXAMPLE 6

Eighty grams of nitrocellulose containing 3.4% nitrogen prepared in Example 2 was beaten in 2.5-gram portions in a Waring Blendor for 15 minutes at a consistency of 1%. The portions were mixed together and aliquot portions of the mixture each containing 2.5 grams of pulp were beaten another 15 minutes. The aliquots were recombined, divided, and beaten twice more, for periods of 15 and 20 minutes, respectively. The total beating time was 65 minutes and the final Canadian freeness of the pulp was 319 milliliters. The combined pulp slurry was transferred to the proportioning tank of a Noble and Wood handsheet machine and diluted to a consistency of 0.41%. To prepare the handsheets, one-quart aliquots of the adjusted slurry were added to the handsheet mold and sheets were formed at a consistency of 0.04%. The sheets were couched under standard conditions recommended by Noble and Wood, and subsequently drum-dried at 200° F. The final basis weight of these sheets was 58 pounds per ream (500 sheets, 24 by 36 inches).

EXAMPLE 7

Eighty grams (dry basis) of nitrocellulose containing 5.2% nitrogen prepared in Example 3 was beaten in a Waring Blendor in 10-gram portions for 55 minutes at a consistency of 2%. The final Canadian freeness of the pulp slurry was 300 milliliters. The slurry was transferred to the proportioning tank of a Noble and Wood handsheet machine and diluted to a consistency of 0.40%. Handsheets were prepared by adding one-quart aliquots of the adjusted slurry to the mold of the handsheet machine and forming sheets at 0.04% consistency. The sheets were couched under standard conditions recommended by Noble and Wood, and subsequently drum-dried at 200° F. The final basis weight of these sheets was 57 pounds per ream (500 sheets, 24 by 36 inches).

The sheets prepared in Examples 4 to 7 were subjected to various tests for the determination of electrical properties. The dielectric constant and dissipation factor were determined according to ASTM D–150–54T by using unguarded 2-inch-diameter electrodes compressed with the smallest feasible force. Dielectric strength tests were made in air at 60 cycles per second according to ASTM D–149–55T by using one-half-inch-diameter stainless steel electrodes. Table I below shows the results of these tests as performed on the sheets prepared from unsubstituted cellulose and from low-nitrogen nitrocellulose.

*Table I*

| Composition of Handsheet | Cellulose (product of Example 4) | Nitrocellulose 2.3% N (product of Example 5) | Nitrocellulose 3.4% N (product of Example 6) | Nitrocellulose 5.2% N (product of Example 7) |
|---|---|---|---|---|
| Dielectric strength in air at 60 c.p.s. (volts/mil.) | 140 | 140 | 141 | 125 |
| Dielectric constant: | | | | |
| $10^2$ c.p.s. | 2.00 | 1.32 | 1.30 | 1.19 |
| $10^5$ c.p.s. | 1.20 | 1.22 | 1.20 | 1.15 |
| Dissipation factor × $10^4$: | | | | |
| $10^2$ c.p.s. | 2,637 | 705 | 595 | 172 |
| $10^5$ c.p.s. | 298 | 78 | 84 | 75 |
| Electrical loss × $10^3$: | | | | |
| $10^2$ c.p.s. | 527 | 93 | 77 | 21 |
| $10^5$ c.p.s. | 36 | 10 | 10 | 9 |
| Bulk density (g./cc.) | 0.35 | 0.36 | 0.36 | 0.43 |

As Table I shows, the sheets prepared from nitrocellulose had substantially lower dissipation factor and electrical loss than did the sheet prepared from plain, unsubstituted cellulose. This is particularly unexpected in view of the fact that dielectric constants of nitrated and un-nitrated papers do not differ greatly.

The low-nitrogen nitrocellulose paper of the present invention contains from 0.5% to 6.0% of nitrogen by weight. If the nitrocellulose has a nitrogen content of less than 0.5% by weight, paper prepared therefrom will not have the desired low dissipation factor and electrical loss. If the nitrocellulose has a nitrogen content above 6.0% by weight, the handling characteristics of the pulp are such that it is not readily and conveniently formed into sheets. The preferred content of nitrogen in the nitrocellulose is from 2.3% to 5.2% by weight.

As an example of the use of this paper as dielectric material, a wire conductor may be insulated as shown in the drawing. The total thickness of low-nitrogen nitrocellulose paper used will be determined by the use to which the conductor is to be put, and the assembly of the insulated conductor will be performed by means conventional in the art.

The present invention has been described in detail in the foregoing disclosure. It will be apparent, however, to those skilled in the art that many variations are possible without departure from the spirit and scope of the invention. Accordingly, the invention is intended to be limited only by the following claims.

We claim:

1. An article which comprises an electrical conductor insulated at least in part with a paper-like sheet of nitrocellulose containing about from 0.5 to 6.0% by weight of nitrogen.

2. An article of claim 1 wherein said nitrocellulose contains about from 2.3 to 5.2% by weight of nitrogen.

References Cited in the file of this patent

UNITED STATES PATENTS

| 1,809,011 | Barker | June 9, 1931 |
| 1,913,416 | Schur | June 13, 1933 |
| 2,011,914 | Schwartz | Aug. 20, 1935 |
| 2,260,343 | Seiberlich | Oct. 28, 1941 |
| 2,472,591 | Kenyon et al. | June 7, 1949 |

FOREIGN PATENTS

| 798,858 | France | Mar. 11, 1936 |